July 6, 1937.    D. N. CROSTHWAIT, JR    2,086,258
EFFECTIVE TEMPERATURE THERMOSTAT
Original Filed June 8, 1932    2 Sheets—Sheet 1
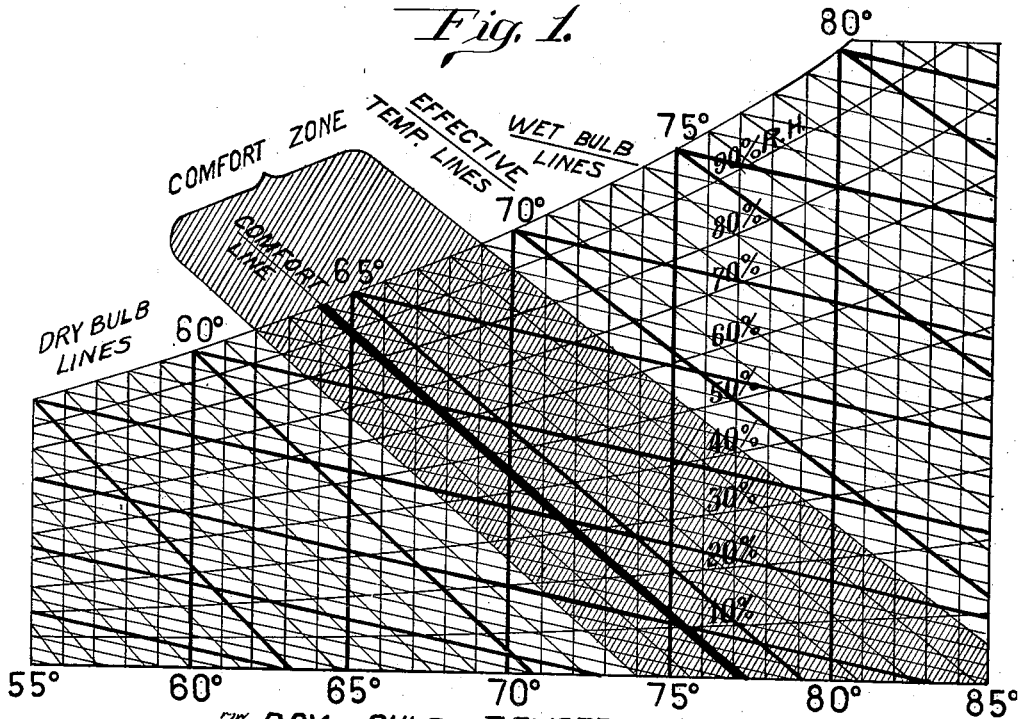
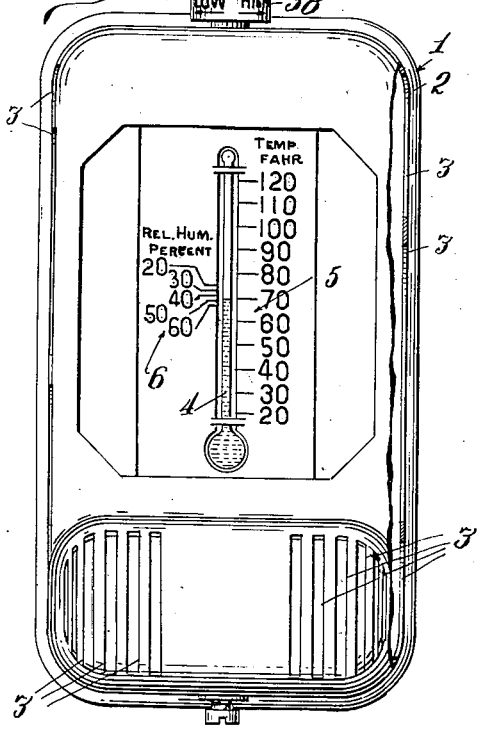
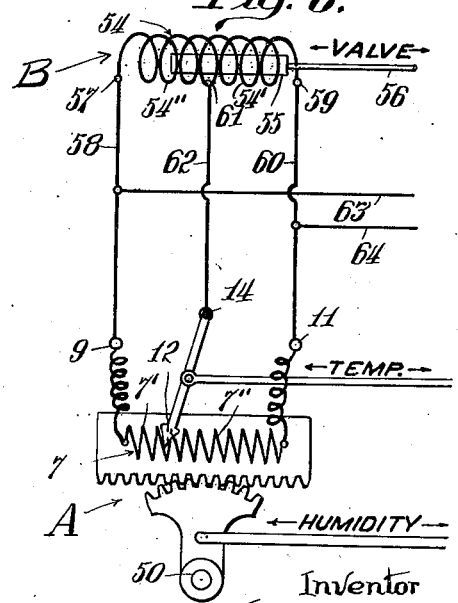
Inventor
David N. Crosthwait Jr.
By Barrett & Truman
Attorneys.

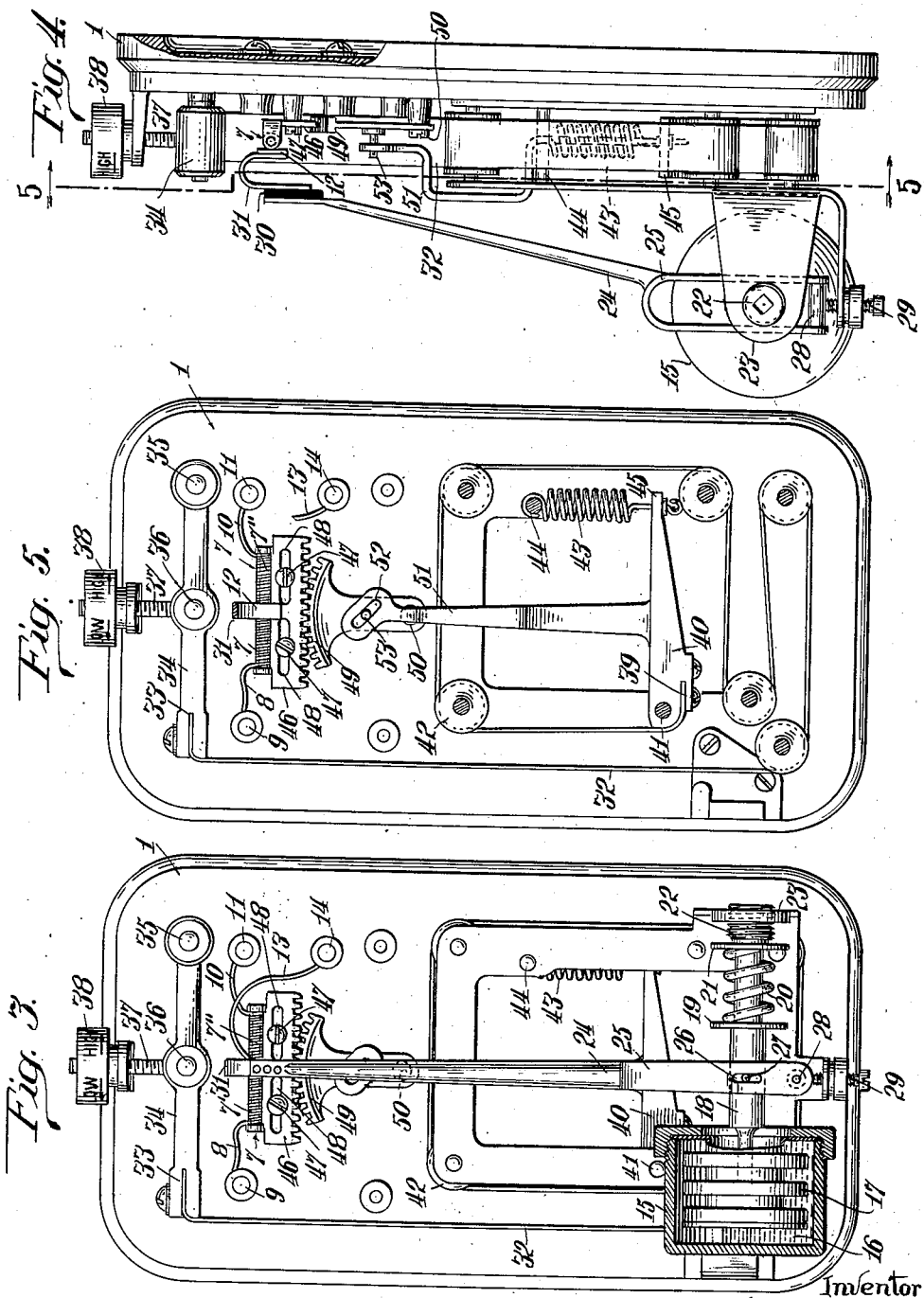

Patented July 6, 1937

2,086,258

UNITED STATES PATENT OFFICE 2,086,258

EFFECTIVE TEMPERATURE THERMOSTAT

David N. Crosthwait, Jr., Marshalltown, Iowa, assignor to C. A. Dunham Company, Marshalltown, Iowa, a corporation of Iowa Original application 713,862, March 3, 1934, which in turn is a division of Serial No. 587,342, January 8, 1932. Divided and this application November 12, 1934, Serial No. 752,623

9 Claims. (Cl. 236—44)

This invention relates to certain new and useful improvements in effective temperature thermostats, and more particularly to improved means for automatically controlling a heating system so that the heat output will maintain a substantially constant condition of human comfort within the building being heated.

This application is a division of the pending application of Crosthwait and Dunham, Serial No. 713,862, filed March 3, 1934, which in turn is a division of application Serial No. 587,342, filed January 8, 1932 which issued on December 15, 1936 as Patent No. 2,064,197. The original application Serial No. 587,342 covers the improved method of heating, and application Serial No. 713,862 covers the complete apparatus combination. The present application covers the specific thermostatic device for controlling the heating system.

It is a matter of common experience that at times, even though a building is maintained at a fixed temperature, this temperature produces sensations of discomfort. For example a temperature of 70° Fahrenheit may, at times, cause a person to experience a sensation of being chilly. At other times a temperature of 70° Fahrenheit may produce a sensation of being too warm. It is usual to encounter the first experience when the humidity is low, and the latter when the humidity is high, that is when the moisture content of the air within the building is greater. Human comfort depends upon the heat dissipation by the skin surface. When the humidity increases the heat abstraction from the skin for a given air movement and temperature decreases, and the sensation of being too warm results. When the humidity decreases, the rate of heat abstraction from the skin for the same air movement and temperature increases with the result of producing a chilly sensation.

In order to produce a condition of constant comfort, the usual practice has been to control the humidity, as well as the temperature. To do this requires humidifying apparatus in addition to heating apparatus, which is sometimes commercially impracticable.

According to the method here used, constant comfort is provided by varying the temperature of the inside air with variations in humidity by increasing the rate of heat supply automatically as the humidity decreases, and vice versa. It has been determined experimentally that there exist certain combinations of temperatures and humidities for a given air motion which produce the same feeling of comfort or discomfort. These combinations of temperatures and humidities which produce equal conditions of comfort have been charted, and the lines passing through these equally effective air conditions are known as equal comfort lines, and the term "effective temperature" as used herein indicates the constant temperature sensation, although the actual dry bulb temperature which produces this sensation will vary as the humidity varies. A maximum number of people will feel comfortable at an "effective temperature" of about 64°, and this is called the "comfort line". While at rest in still air, it has been found that 97% of all people are comfortable at this temperature.

In maintaining effective temperatures, it is essential not to produce chilly sensations as the result of the absence of radiant heat. This means that heat must be supplied to a building at substantially the same rate the building is losing it, that is, so long as heat is necessary, this heat should be supplied continually at varying rates and not intermittently. This condition is best maintained by utilizing steam at controlled subatmospheric pressures as the heating medium, as broadly disclosed in the patent to Clayton A. Dunham, No. 1,644,114, granted October 4, 1927. The present invention relates to an apparatus suitable for controlling such a system, although its use is not limited thereto.

Obviously the most satisfactory result in maintaining equal comfort conditions is only obtainable when the system is completely automatically controlled. According to the present invention, the supply of steam or other heating medium is automatically regulated so as to just replace the heat losses and constantly maintain the desired effective temperature. The instrument which forms the particular subject matter of this invention is designed to proportionately control the opening or setting of a valve so as to regulate the flow of heating medium therethrough, and this proportionate control is in response to both temperature and humidity changes in the space that is being heated. The humidity responsive mechanism cooperates with the thermostatic control mechanism so as to vary the actual temperature maintained in accordance with variations in humidity so that a substantially constant predetermined effective temperature will be maintained within the building, thus producing approximately constant comfort conditions.

The general object of this invention is to provide an improved controlling apparatus for maintaining constant comfort conditions within a building, as briefly described hereinabove and disclosed more in detail in the specifications which follow.

Another object is to provide an improved combination temperature controlled and humidity controlled mechanism for regulating a heating system.

Another object is to provide an improved effective temperature thermostat.

Another object is to provide an improved electrically operated combination of elements for controlling the proportionate movement of a valve or other device in response to both temperature and humidity changes in a given space.

Another object is to provide an improved device for visibly indicating dry bulb temperatures and also the corresponding relative humidities.

Another object is to provide a combination effective temperature controller and relative humidity indicator.

Other objects and advantages of this invention will be more apparent from the following detailed description of one approved form of apparatus designed and constructed according to the principles of this invention.

In the accompanying drawings:

Fig. 1 is a comfort chart illustrating the combinations of dry bulb temperatures and percentages of humidity which correspond to the effective temperatures.

Fig. 2 is a front elevation of the improved thermostat and indicating device.

Fig. 3 is a front elevation of the thermostat with the cover removed, the thermostatic element being shown in vertical section.

Fig. 4 is a side elevation looking from the right at the apparatus shown in Fig. 3.

Fig. 5 is a vertical section taken substantially on the line 5—5 of Fig. 4.

Fig. 6 is a wiring diagram illustrating the functioning of this apparatus in the control of a heating system.

Reference will first be made to Fig. 1 to explain more clearly the "effective temperatures" which the apparatus later to be described is designed to establish and maintain. Referring to this chart, the ordinary dry bulb temperature readings are indicated by the vertical lines, and are read on the horizontal scale at the bottom of the chart. The wet bulb temperature readings are indicated on the scale along the top of the chart, and by the approximately horizontal lines sloping downwardly toward the right. The percentages of relative humidity in the air are indicated by the lines curving upwardly from the left hand side of the chart. The lines sloping downwardly at approximately 45° from the upper left to the lower right of the chart are the effective temperature lines, that is, lines indicating temperature and humidity combinations which will produce sensations of constant comfort to the occupants of the building. The shaded area is known as the comfort zone (any effective temperatures within this zone being considered comfortable by the majority of average human beings), and the heavy line passing through the point corresponding to dry bulb and wet bulb readings at 64° and 100% relative humidity is known as the "comfort line", the combinations of dry bulb temperatures and humidities corresponding to points on this line producing ideal comfort conditions for the majority of people. For example, with entirely saturated air, a dry bulb temperature of 64° will establish an approximately ideal condition of comfort within the building. If the air has a 50% relative humidity, the ordinary dry bulb temperature should be approximately 69°. For a 10% relative humidity, the ordinary temperature reading would be 76°, etc. It will thus be seen that in order to maintain a desired "effective" temperature of, for example 64°, it is necessary to vary the ordinary dry bulb temperature of the air within the building in accordance with changes in the relative humidity of this air. In other words, the thermostatic mechanism hereinafter described does not maintain an absolutely standard dry bulb temperature but varies this standard temperature in accordance with changes in the relative humidity of the air so as to maintain a constant standard effective temperature which will maintain constant conditions of comfort.

Referring now more particularly to Figs. 2, 3, 4 and 5, the improved instrument will be disclosed for maintaining the desired effective temperature by responding simultaneously to variations in the dry bulb temperature and also to variations in the humidity of the air. The operating elements of this instrument are mounted on a supporting base 1, and enclosed by a removable casing or cover 2 provided with openings 3 for the free passage of air therethrough. On cover 2 is mounted an ordinary dry bulb thermometer 4, at the right of which is a scale 5 indicating the dry-bulb temperature, and at the left a scale 6 indicating the corresponding relative humidity. This thermometer does not form an actual part of the automatic controlling mechanism, but it does indicate the actual temperature that is being maintained, and it also indicates on scale 6 the actual relative humidity, as will be hereinafter pointed out.

Referring now to Figs. 3, 4 and 5, a suitable electric resistance element 7, preferably in the form of an exposed resistance coil, is connected at one end by a wire 8 with a binding post 9, and is connected at the other end by a wire 10 with a binding post 11. A contact member 12 is in constant engagement with the resistance element 7 intermediate the ends thereof, and is movable to adjust its position on the resistance by mechanism hereinafter described. This movable contact 12 is connected through wire 13 with a binding post 14. It will be noted that the resistance 7 is divided into two effective resistances 7' and 7", the relative values of which will change, dependent upon the position of movable contact 12 intermediate the ends of resistance 7. One of these resistances 7' is connected in one control circuit, and the other resistance 7" is positioned in a second control circuit, and the variations in the relative currents passing through these two circuits (depending upon the relative values of the resistance sections 7' and 7") operate as hereinafter explained to cause proportionate movements in one direction or the other of a controlled device.

The thermostatic element is here shown in the form of a hermetically sealed casing 15 containing a quantity of temperature responsive fluid 16, one wall of the casing being in the form of a flexible diaphragm or bellows 17. The volume of the fluid 16 will change in accordance with changes in temperature, and the flexible bellows 17 will expand or contract in order to adjust the capacity of vessel 15 to the volume of the heat responsive fluid 16. An operating stem 18 extends from the movable end of bellows 17 and is provided with a fixed collar 19 engaging one end of a compression spring 20 which abuts at its other end against a collar 21 on a screw 22 adjustable in a fixed bracket 23. The reduced end portion of stem 18 is slidable within the hollow screw 22. The spring 20 opposes the movement of the plunger stem 18, and by adjusting the position of screw 22 the amount the thermostat will move for a given temperature change can be varied. A lever 24 is formed with a yoke 25 which straddles the stem or plunger 18, the arms of the yoke being slotted at 26 to receive the ends of a pin 27 secured in the plunger. The lower end of lever 24 is fulcrumed at 28 on a vertically adjustable screw 29. The contact member 12 is carried on an insulating block 30 at the upper end of lever 24 by means of the bowed spring 31 which holds the contact yieldably in engagement with resistance 7. It will now be apparent that the thermostat 15 through plunger 18 swings lever 24 about its fulcrum 28 and thus moves contact 12 longitudinally of resistance 7. By adjusting the fulcrum screw 29, the relative lengths of the upper and lower arms of lever 24 can be changed, thereby adjusting the rate of movement of contact 12 longitudinally of resistance 7 in response to any given temperature responsive movement of the thermostat.

The humidity responsive mechanism comprises a long hygroscopic strip or membrane 32 which is anchored at one end 33 to a lever 34 fulcrumed at its opposite end 35 on the base 1 and intermediately pivoted at 36 to an adjusting screw 37 extending upwardly through an adjusting nut 38 mounted at the top of the casing. The other end of the hygroscopic strip 32 is secured at 39 to the bellcrank 40 fulcrumed at 41. The strip or membrane 32 is so formed that it will vary its elongation with changes in the relative humidity of the air, the strip elongating with increasing humidity and contracting as the humidity decreases. In order to utilize a membrane of sufficient length to give a relatively large operating movement, the membrane or strip is passed around a plurality of direction pulleys 42. The spring 43 anchored at one end 44 and attached at its other end to one arm 45 of the bellcrank, serves to keep the flexible strip 32 under tension so that any changes in the length thereof will cause swinging movement of bellcrank 40 about the fulcrum 41. The operative effect of the hygroscopic strip 32 may be varied by turning the adjusting nut 38.

The resistance element 7 is adjustably mounted on a longitudinally movable rack bar 46 by means of screws 47 adjustable in slots 48 in the rack bar. A gear sector 49 meshes with rack bar 46 and is pivotally mounted on the base member at 50. The upwardly extending arm 51 of bell-crank 40 is formed with a cam slot 52 in which engages a pin 53 projecting forwardly from the gear sector 49.

It will now be apparent that the contact member 12 is moved longitudinally of resistance 7 a distance which is proportional to dry bulb temperature changes to which the thermostatic element 15 responds. At the same time the resistance element 7 is moved bodily, in the direction of its own length, in response to changes in the relative humidity of the air. Assuming, for example, that the air within the building is at a temperature (dry bulb temperature) of 68°, and the relative humidity of the air is 60%. It will be noted from the comfort chart that this corresponds approximately to a point on the "comfort line", that is corresponding to an effective temperature of 64°, and if the mechanism is in proper adjustment, the contact 12 should be positioned substantially equi-distant between the two ends of resistance 7, as shown in the drawings. Assuming now that the temperature of the air should be raised to 72° and the relative humidity remains constant at 60%, an effective temperature of approximately 67° will prevail and it will be desirable to reduce the rate at which heat is imparted to the air by the heating system so as to lower the temperature to the desired effective temperature of 64°. Under these circumstances the resistance 7 does not move, but the contact 12 moves toward the right end of the resistance so as to increase the resistance 7' and decrease the resistance 7'' in proportion to this variation in temperature from the desired effective temperature, and this variation in the values of the resistances 7' and 7'' will operate, in the manner hereinafter described, to effect a corresponding and proportionate adjustment of the heating system. Let us now assume that at the same time the temperature increases from 68° to 72° there has been a drop in the relative humidity of the air from 60% to 30%. It will be noted that a temperature of 72° and a relative humidity of 30% correspond approximately to another point on the 64° effective temperature comfort line so that under these conditions there is no reason why there should be any change in the adjustment of the heating system. The parts are so adjusted that this decrease in the relative humidity will cause a contraction of membrane 32 sufficient to swing the lever 51 and through cam slot 52 and pin 53 oscillate the gear sector 49 and through rack 46 cause a longitudinal movement of resistance 7 to the right just sufficient to compensate for the movement of contact member 12 so that the resistance and contact will maintain approximately the same relative positions as now shown. If the relative humidity had only dropped to 50%, it will be noted from the comfort chart that the corresponding effective temperature (with a dry-bulb temperature of 72°) is approximately 66°. The desirability of a decrease in the heat output from the heating system is thus indicated, although not as great a change as will be indicated by the dry-bulb temperature of 72° if there had been no change in the original relative humidity of 60%. Accordingly, the resistance 7 is moved a short distance to the right by the hygroscopically responsive mechanism, but not as great a distance as the contact member 12 has been moved, so that there still remains a proportionate change in the two resistance sections 7' and 7'' to effect a proper proportionate adjustment of the heating system. Obviously, if the relative humidity should rise at the same time that the temperature rises, the resistance 7 and contact 12 will be moved in opposite directions so as to produce a correspondingly greater increase in the proportionate change of resistances 7' and 7''. It will be noted from a study of the comfort chart that the increments of temperature change are not uniform for equal increments of humidity change. That is, as the humidity decreases, the dry-bulb temperature must increase at a more rapid rate and vice versa. Accordingly, the cam 52, which may be made adjustable, has been provided, which is so proportioned that the movement of the resistance element 7 will be in proper relation to the movements of the contact member 12 to maintain the desired effective temperature.

The method in which this apparatus controls a heating system will now be described, referring more particularly to Fig. 6. In this diagrammatic view the thermostatic instrument (hereinabove described in detail) is indicated at A, and at B is indicated a motor device for controlling a valve or some other adjusting device of the heating system. The motor device B comprises a solenoid coil 54 in which is a movable core 55 from which extends the operating stem 56. One terminal 57 of coil 54 is connected through wire 58 with binding post 9 of the instrument A. The other terminal 59 of the solenoid coil is connected through wire 60 with binding post 11 of the thermostat. A central terminal 61 of the solenoid is connected by wire 62 with the binding post 14 in electrical connection with the movable contact 12 of the thermostat. It will be noted that the solenoid coil is divided into two effective portions 54' and 54", the coil 54' being in circuit between the wires 60 and 62, and the coil 54" in circuit between the wires 58 and 62. Wires 63 and 64 leading from any suitable source of electric power connect respectively with the wires 58 and 60. It will now be noted that there are two parallel circuits between the power mains 63 and 64, one of these circuits containing the solenoid coil 54' and the resistance 7' in series, and the other circuit containing the solenoid coil 54" and resistance 7" in series. If the movable contact 12 were positioned exactly midway the ends of the resistance 7, the resistance in each of the two parallel circuits would be the same and equal currents would flow through each end of the solenoid 54 so that the core 55 would be positioned centrally within the solenoid coil. However, if movable contact 12 is displaced toward one end of the resistance so that the resistance 7' is decreased and the resistance 7" increased, the total resistance in one of the parallel circuits will be greater than that in the other circuit, and a stronger current will flow through the section 54' of the solenoid than through the other section 54". Consequently the core 55 will be displaced toward the right hand end of the solenoid, as shown in Fig. 6. It will be apparent that if the movable contact 12 were moved toward the opposite end of resistance 7 so as to increase the resistance 7' and decrease the resistance 7", the current flowing through solenoid section 54" would be greater than that flowing through section 54' and the core 55 would be displaced toward the left. In either event, the amount of longitudinal displacement of core 55 will be proportional to the variation in the two resistances 7' and 7". It will also be apparent that similar results would be obtained if the movable contact 12 remained stationary and the resistance 7 were displaced longitudinally by changes in the relative humidity of the air. Actually, the variation in the values of resistances 7' and 7" will respond to changes in both temperature and relative humidity, that is, the changes in the values of these resistances will be proportionate to the variations from the desired effective temperature for which the apparatus is adjusted. The longitudinal displacements of operating stem 56 extending from solenoid coil 55 are utilized to effect (through suitable intermediate mechanisms such as disclosed, for example, in the parent applications hereinabove referred to) proportionate opening and closing movements of a valve or other device which controls the flow of heating medium to the heating system.

It will be noted that this apparatus does not merely function to completely open or completely close a valve when certain predetermined minimum and maximum temperatures are reached, but proportionately adjusts the valve so that a continuous flow of heating medium through the heating system can be maintained, although this continuous flow will be slightly increased or decreased in order to compensate for variations from the desired effective temperature that is to be maintained in the space heated.

This apparatus has been described throughout as adjusted for maintaining some one predetermined effective temperature, for example, 64°. A higher effective temperature, for example 66°, may be preferred in winter weather. By making suitable adjustments of the nut 29 at the bottom of the instrument and the nut 38 at the top of the instrument, other effective temperatures may be maintained if so desired.

Referring now again to the indicating device shown in Fig. 2, it will be apparent that the thermometer 4 on the face of the instrument indicates on scale 5 the actual dry-bulb temperature that prevails in the space where this instrument is positioned. However, since the apparatus with which this thermometer is associated functions to maintain effective temperatures it will be apparent that the actual relative humidity of the air will be the relative humidity indicated by the comfort chart shown in Fig. 1 for that particular dry-bulb temperature. For example, it will be noted from the chart that for a dry-bulb temperature of 70° and the effective temperature of 64° that is being maintained, the relative humidity of the air is approximately 45%. It will be also noted that when the thermometer 4 registers 70° on scale 5 (Fig. 2) it also indicates 45% on scale 6. Therefore the prevailing relative humidity may be read directly on this instrument, providing, of course, the instrument is adjusted for maintaining the normal effective temperature at 64°. If the instrument is adjusted to maintain a different effective temperature, scale 6 would have to be adjusted up or down in order to read accurately, or a different scale could be substituted. This indicating thermometer forms a simple and convenient instrument for not only indicating to the observer the actual dry-bulb temperature that is being maintained but also the prevailing relative humidity. If this relative humidity is too low steps can be taken to correct this condition by adding moisture to the air. However, even though the humidity is not corrected, a comfortable temperature will be automatically maintained by the heating system under the control of this apparatus.

I claim:

1. A temperature controlling device for heating systems, comprising a resistance member, one terminal of a circuit connected to one end of the resistance, one terminal of another circuit connected to the other end of the resistance, a contact member in constant engagement with the resistance intermediate the ends thereof, the other terminals of the two circuits being connected with the contact member, a heat responsive member, means actuated by the heat responsive member for moving the contact longitudinally of the resistance to determine the fraction of the resistance that is included in each circuit, a humidity responsive member, and means actuated by the humidity responsive member for moving the resistance longitudinally with respect to the contact member.

2. A temperature controlling device for heating systems, comprising a resistance member, one terminal of a circuit connected to one end of the resistance, one terminal of another circuit being connected to the other end of the resistance, a contact member in constant engagement with the resistance intermediate the ends thereof, the other terminals of the two circuits being connected with the contact member, a heat responsive member, a humidity responsive member, means actuated by one of these members for moving the resistance lengthwise, and means actuated by the other member for moving the contact longitudinally of the resistance, whereby the position of the contact on the resistance is varied in accordance with both temperature and humidity changes to determine the fractional portion of the resistance which is effective in each circuit.

3. A temperature controlling device for heating systems, comprising a resistance member, one terminal of a circuit connected to one end of the resistance, one terminal of another circuit being connected to the other end of the resistance, a contact member in constant engagement with the resistance intermediate the ends thereof, the other terminals of the two circuits being connected with the contact member, a heat responsive member, a lever fulcrumed at one end, the contact member being carried by the free end of the lever, actuating connections between the heat responsive member and an intermediate portion of the lever whereby the contact is moved longitudinally of the resistance in response to temperature changes, a longitudinally movable rack bar on which the resistance is mounted, a gear sector engaged with the rack, a flexible member which expands or contracts lengthwise in response to humidity changes, means for adjustably anchoring one end of this member, a lever to which the other end of the flexible member is secured, and cam connections between the last mentioned lever and the gear sector so that a predetermined longitudinal movement is imparted to the resistance in response to humidity changes.

4. A temperature controlling device for heating systems, comprising a resistance member, one terminal of a circuit connected to one end of the resistance, one terminal of a circuit connected to the other end of the resistance, a contact member in constant engagement with the resistance intermediate the ends thereof, the other terminals of the two circuits being connected with the contact member, a heat responsive member, a humidity responsive member, means actuated by one of these members for moving the resistance lengthwise, and means actuated by the other of the members for moving the contact lengthwise of the resistance, whereby the position of the contact on the resistance is varied in accordance with both temperature and humidity changes to determine the fractional portion of the resistance which is effective in each circuit, the means actuated by the humidity responsive member increasing the proportionate movements imparted by this member as the humidity increases, and decreasing these proportionate movements as the humidity decreases.

5. In combination, in a temperature controlling device, a motor in the form of a solenoid coil, a core movable therein in opposite directions from a centered position, and means actuated by the movements of the core for controlling the flow of heating medium, a resistance member, a contact member in constant engagement with the resistance intermediate the ends thereof so as to divide the resistance into two effective portions, an actuating circuit having two parallel branches in one of which is included one half of the solenoid coil and one of the effective portions of the resistance, and in the other of which is included the other half of the solenoid coil and the other effective portion of the resistance, a heat responsive member, a humidity responsive member, means actuated by one of these members for moving the resistance lengthwise, and means actuated by the other member for moving the contact lengthwise of the resistance whereby the position of the contact on the resistance is varied in accordance with both temperature and humidity changes to determine the fractional portion of the resistance that is in circuit with each half of the solenoid.

6. A temperature controlling device for heating systems comprising a heat responsive member, a humidity responsive member, and a control device comprising a pair of members in constant direct engagement with one another independently movable in substantially parallel paths, the movement of one of these members in one direction or the movement of the other member in the opposite direction, or both such movements, serving to increase the temperature in proportion to the extent of relative movement of the members, while respective movements in the opposite directions serve to correspondingly lower the temperature, means actuated by the heat responsive member for moving one of the engaging members in one direction or the other as the temperature rises or falls respectively, and means actuated by the humidity responsive member for moving the other engaging member in these respective directions as the humidity decreases or increases.

7. A temperature controlling device for heating systems comprising a heat responsive member, a humidity responsive member, and a control device comprising a pair of members in constant direct engagement with one another and independently movable in substantially parallel paths, the movement of one of these members in one direction or the movement of the other member in the opposite direction, or both such movements, serving to increase the temperature in proportion to the extent of relative movement of the members, while respective movements in the opposite directions serve to correspondingly lower the temperature, means actuated by the heat responsive member for moving one of the engaging members in one direction or the other as the temperature rises or falls respectively, means actuated by the humidity responsive member for moving the other engaging member in these respective directions as the humidity decreases or increases, and means for decreasing the proportionate movement of the member moved by the humidity responsive member as the humidity decreases, and vice versa.

8. A temperature controlling device for heating systems comprising a heat responsive member, a humidity responsive member, and a control device comprising a pair of members in constant direct engagement with one another and independently movable in substantially parallel paths, the movement of one of these members in one direction or the movement of the other member in the opposite direction, or both such movements, serving to increase the temperature in proportion to the extent of relative movement of the members, while respective movements in the opposite directions serve to correspondingly lower the temperature, means actuated by the heat responsive member for moving one of the engaging members in one direction or the other as the temperature rises or falls respectively, means actuated by the humidity responsive member for moving the other engaging member in these respective directions as the humidity decreases or increases, and adjusting means whereby the amplitude of the movements imparted to one of the engaging members by the temperature responsive member may be increased or decreased for equal increments of temperature change.

9. A temperature controlling device for heating systems comprising a heat responsive member, a humidity responsive member, and a control device comprising a pair of members in constant direct engagement with one another and independently movable in substantially parallel paths, the movement of one of these members in one direction or the movement of the other member in the opposite direction, or both such movements, serving to increase the temperature in proportion to the extent of relative movement of the members, while respective movements in the opposite directions serve to correspondingly lower the temperature, means actuated by the heat responsive member for moving one of the engaging members in one direction or the other as the temperature rises or falls respectively, means actuated by the humidity responsive member for moving the other engaging member in these respective directions as the humidity decreases or increases, and adjusting means whereby the relative positioning of the engaging members for any given temperature and humidity may be changed.

DAVID N. CROSTHWAIT, JR.